US005692033A

United States Patent [19]
Farris

[11] Patent Number: 5,692,033
[45] Date of Patent: Nov. 25, 1997

[54] AIN QUEUING FOR CALL-BACK SYSTEM

[75] Inventor: Robert D. Farris, Sterling, Va.

[73] Assignee: Bell Atlantic Network Services, Inc., Arlington, Va.

[21] Appl. No.: 589,360

[22] Filed: Jan. 22, 1996

[51] Int. Cl.$^6$ ................................................ H04M 3/00
[52] U.S. Cl. ........................ 379/67; 379/201; 379/209; 379/207; 379/265
[58] Field of Search ............................... 379/265, 266, 379/207, 201, 216, 309, 67, 88, 89, 209, 208, 214

[56] References Cited

U.S. PATENT DOCUMENTS

| | | | |
|---|---|---|---|
| 4,878,240 | 10/1989 | Lin et al. | 379/67 |
| 4,953,204 | 8/1990 | Cuschleg, Jr. et al. | 379/266 |
| 5,212,727 | 5/1993 | Ramkumar | 379/221 |
| 5,247,571 | 9/1993 | Kay | 379/207 |
| 5,268,957 | 12/1993 | Albrecht | 379/67 |
| 5,278,898 | 1/1994 | Cambray et al. | 379/266 |
| 5,303,301 | 4/1994 | Takahata | 379/142 |
| 5,309,505 | 5/1994 | Szlam et al. | 379/88 |
| 5,311,574 | 5/1994 | Livanos | 379/88 |
| 5,311,583 | 5/1994 | Friedes | 379/209 |
| 5,425,091 | 6/1995 | Josephs | 379/201 |
| 5,436,957 | 7/1995 | McConnell | 379/88 |
| 5,444,774 | 8/1995 | Frieds | 379/266 |
| 5,452,350 | 9/1995 | Reynolds et al. | 379/265 |
| 5,467,388 | 11/1995 | Redd, Jr. et al. | 379/207 |

Primary Examiner—Krista M. Zele
Assistant Examiner—Daniel S. Hunter
Attorney, Agent, or Firm—Lowe, Price, LeBlanc & Becker

[57] ABSTRACT

An arrangement in an intelligent network for queuing incoming calls to a destination number during peak calling times and initiating call-backs based on the order that the incoming calls were originally placed in the queue. Translation tables in a subscriber's telephone switching office have terminate attempt triggers and disconnect triggers set to the subscriber's number. A disconnect detection triggers a query from the telephone switching office to an integrated services control point (ISCP), at which point the ISCP accesses the first caller in the queue and sends a message to the originating office serving the first caller to ring the first caller and the subscriber's number. A call to the subscriber's number triggers a query from the telephone switching office serving the subscriber to the ISCP. If the call is from the first caller in the queue, the ISCP instructs the telephone switching office to connect the call to the subscriber. If the call is not from the first caller in the queue, the ISCP instructs the telephone switching office to route the call to an announcement platform, such as an intelligent peripheral, to collect information regarding adding the calling party to the queue. The announcement platform supplies to the ISCP the collected information, including the calling number and the time of call, and the ISCP adds the collected information to the queue.

19 Claims, 8 Drawing Sheets

AIN QUEUING FOR CALL-BACK SYSTEM

TECHNICAL FIELD

The present invention relates to an Advanced Intelligent Network that enables a subscriber to utilize queuing systems in order to handle a large number of incoming calls.

ACRONYMS

The written description uses a large number of acronyms to refer to various services and system components. Although generally known, use of several of these acronyms is not strictly standardized in the art. For purposes of this discussion, acronyms therefore will be defined as follows:

Action Control Point (ACP)
Advanced Intelligent Network (AIN)
Call Processing Record (CPR)
Common Channel Inter-office Signalling (CCIS)
Data and Reporting System (DRS)
Dual Tone Multifrequency (DTMF)
Integrated Service Control Point (ISCP)
Intelligent Peripheral (IP)
Multi-Services Application Platform (MSAP)
Office Action Control Point (OSO-ACP)
Personal Communications Service (PCS)
Personal Identification Number (PIN)
Plain Old Telephone Service (POTS)
Point In Call (PIC)
Point of Presence (POP)
Service Control Point (SCP)
Service Creation Environment (SCE)
Service Management System (SMS)
Service Switching Point (SSP)
Signaling Point (SP)
Signaling System 7 (SS7)
Signaling Transfer Point (STP)
Transaction Capabilities Applications Protocol (TCAP)

BACKGROUND ART

In recent years, a number of new service features have been provided by an enhanced telephone network, sometimes referred to as an Advanced Intelligent Network (AIN). In an AIN type system, local and/or toll offices of the public telephone network detect one of a number of call processing events identified as AIN "triggers". For ordinary telephone service calls, there would be no event to trigger AIN processing, and the local and toll office switches would function normally and process such calls without referring to the central database for instructions. An office which detects a trigger will suspend call processing, compile a call data message and forward that message via a common channel interoffice signalling (CCIS) link to an Integrated Service Control Point (ISCP) which includes a Multi-Services Application Platform (MSAP) database. If needed, the ISCP can instruct the central office to obtain and forward additional information.

Once sufficient information about the call has reached the ISCP, the ISCP accesses its stored data tables in the MSAP database to translate the received message data into a call control message and returns the call control message to the office of the network via CCIS link. The network offices then use the call control message to complete the particular call. An exemplary AIN type network for providing an Area Wide Centrex service is disclosed and described in detail in commonly assigned U.S. Pat. No. 5,247,571 to Kay et al., the disclosure of which is entirely incorporated herein by reference.

The AIN type network has been used to provide a variety of flexible services for customers. For example, AIN services have been developed to provide a call-back type of service in an AIN network, whereby a caller who reaches a busy line can receive a call-back when the busy line is disconnected.

U.S. Pat. No. 5,425,091 to Josephs discloses a call-back type service in an AIN network, whereby an automatic customer call-back (ACC) service subscriber can receive a notification when a called party line is no longer busy. Specifically, when a caller subscribing to the call-back service calls a line that is busy, the calling party is prompted via a recorded announcement whether to activate the ACC service. If the calling party elects to activate the ACC service, the calling party inputs the appropriate DTMF signal, and the collected digits of the called party telephone number and the calling party telephone number are provided to an adjunct processor, illustrated as an intelligent peripheral. The called party line is then monitored, either by the adjunct processor or the central office switch, to detect when the called party telephone line has reached an idle condition. When the idle condition is detected, the adjunct processor initiates a call, prompting the called party to call back the original calling party who activated the ACC service. Alternatively, a three-way call may be automatically originated from the adjunct processor to the called party and the calling party, whereby following completion of the telephone call, the adjunct processor is disconnected.

U.S. Pat. No. 5,212,727 to Ramkumar discloses a telecommunication switching system integrating intelligent network services with regular telephone services to control call routing based on availability of destination stations. The system includes a service control processor (SCP) that keeps track of how many telephones at a subscriber premises are available for incoming calls by monitoring when a service representative at the subscriber premises hangs up the telephone. Each time a call is disconnected upon hanging up, a counter is updated by the SCP in order to determine the total number of telephones available to accept incoming calls. If the SCP determines that all the telephones are currently used during an attempt to route a call to the subscriber premises, then a switch will be instructed to place that call on hold until one of the telephones becomes available, for example by playing a message while the call is awaiting service. Alternatively, the call may be routed to a PBX, located on the customer's premises, and the PBX either routes the call or places the caller on hold, depending on whether or not there are any available telephone lines.

Other systems are known that provide call-back features without the use of AIN services. For example, U.S. Pat. No. 5,311,574 to Livanos discloses an automatic call distribution (ACD) system providing automatic customer call-back, whereby a record of a calling number is made and stored when no agent is immediately available to accept the incoming call, and the calculated delay before an agent is likely to become available is above a predetermined threshold. When an agent becomes available, the ACD removes the top entry from the stored records, places the call to the received calling number, and presents the call to an available agent.

U.S. Pat. No. 5,311,583 to Friedes et al. discloses an international priority calling system call-back feature for processing a telephone call initiated from a first network to a second network having temporarily unavailable resources. The disclosed system completes the call by estimating the anticipated time before resources are available, offering the caller the option of call-back, calling back the caller when network resources are expected to become available, establishing a connection between the two networks, and merging the two calls. Thus, when an end-to-end circuit is not available for a call directed to an international destination, the call is transferred to a subsystem within the caller's domestic network, which provides the caller the options of waiting in a queue for the next available circuit, being called back, or leaving a telephone number at which the calling party can be called back.

U.S. Pat. No. 5,303,301 to Takahata discloses a telephone apparatus within a telephone exchange and having a call-back indication to assist a user in remembering whether a stored number has been called back. An internal microprocessor includes a memory portion that stores the calling party's telephone number from the telephone number data detection circuit. A second memory stores information indicating whether an identified telephone number has been called back. The telephone also includes a display having a call-back flag, indicating whether a displayed telephone number has been called back. Thus, a user can keep track of whether a stored telephone number has been called back.

U.S. Pat. No. 5,268,957 to Albrecht discloses an automatic call-back "camp-on" service for a communications system such as a voice mail system or private branch exchange (PBX). When a call between two communication devices cannot be completed due to a called communication device being busy or unanswered, the calling party can activate the voice mail system to automatically complete that call whenever the other telephone is placed on-hook without further involving the calling party. One proposed procedure involves the calling party depressing a predetermined button on the telephone for a predetermined code once the calling party determines that the called party is busy. The predetermined code is received by the communication system, which notifies the voice mail system of the automatic call-back request and transmits the called and calling number for storage in predetermined memory locations of the voice mail system. The equipment in the voice mail and communication systems periodically interrogate the called number until it is found on-hook. Once the called number is found on-hook, the voice mail system tries to complete the call by ringing the calling party and then the called party. Should the calling party be off-hook at the time, the communication system tries again to complete the call when both parties are found on-hook.

Thus, the disclosed systems use computer-controlled systems to perform call-back functions. In addition, any queuing-type arrangement is provided by the localized distribution systems serving a group of agent stations, for example a plurality of service representatives connected to a PBX.

Many businesses, however, do not own private branch exchanges, but rather rely on one or two telephone lines for their operations. However, such businesses may receive a large volume of calls at certain times of the week. For example, a golf course may accept reservations for tee times for the following week every Monday at 8:00 a.m. At that time, persons desiring a reservation begin calling the destination station. The first caller gets through, but subsequent callers receive busy signals. When a first call is disconnected, the next person that happens to be calling in at that exact time gets through to the destination station, with all subsequent callers receiving busy signals. Hence, callers attempting to reach the destination station will turn on auto dialers having auto-repeat features, whereby the calling stations automatically call the desired number every thirty seconds until the call is answered. Such a calling pattern by a plurality of callers overloads the switching office serving the destination station, in this case the golf course.

Moreover, the only callers that actually get through to the destination station are those that happen to dial in at the precise moment that the destination station disconnects with an existing call. Thus, the plurality of callers would even preempt the arrangement in the above-identified Josephs patent by calling at the same time that the intelligent peripheral or other adjunct processor attempted to initiate a call-back in the form of a typical telephone call.

DISCLOSURE OF THE INVENTION

There is a need for an arrangement that provides a queuing service that organizes callers based on the sequence in which the callers dial the destination station.

There is also a need for an arrangement that prevents callers from preempting a queuing service at the time the called party disconnects from an existing call.

There is also a need for a queuing arrangement that can be implemented by subscribers to a public telephone network without the necessity for computer-based systems at the subscribers' premises.

There is also a need for providing a queuing service in an advanced intelligent network, whereby outgoing calls from the called party's premises (i.e., the destination station) can be blocked at predetermined intervals to accommodate the large traffic of incoming calls at peak hours.

These and other needs are met by the present invention, whereby an intelligent network manages all calls to a destination number during peak calling times by placing incoming calls in a queue and initiating call-backs based on the order that the incoming calls were originally placed in the queue.

In accordance with the present invention, all calls to a subscriber number are intercepted and placed in a queue during peak calling times. A call to the subscriber's number triggers a query from a telephone switching office serving the subscriber to an integrated services control point (ISCP). The ISCP instructs the telephone switching office to route the call to an announcement platform that notifies the calling party of the queuing arrangement. If the calling party desires to be entered into the queue, the calling party enters specific digits in response to prompts from the announcement platform. The telephone switching office sends a message for the ISCP to add the calling party to the queue, and the ISCP adds to the queue a record comprising the called and calling party numbers, and the time of the call.

At the time that the subscriber disconnects an existing telephone call, the telephone switching office serving the subscriber notifies the ISCP of the completed call. The ISCP then accesses the queue, and notifies the originating telephone switching office to ring both the calling party identified in the queue and the subscriber. Upon receiving the incoming call, the telephone switching office serving the subscriber sends a message to the ISCP regarding the incoming call. The ISCP, recognizing the calling party as the number at the top of the queue, sends a command to the telephone switching office to terminate the call to the subscriber, at which point the queue is advanced for the next caller at the time the subscriber disconnects the call.

In another aspect of the present invention, the central office serving the subscriber (i.e., the destination station) is set to block all outgoing calls from the destination station at the time of peak usage. Thus, the blocking feature enables the destination station to serve all the calling parties in the queue as quickly as possible.

These and other advantages of the present invention will become readily apparent upon the review of the following detailed description and accompanying drawings, and the appended claims.

BRIEF DESCRIPTION OF DRAWINGS

Reference is made to the attached drawings, wherein elements having the same reference numeral designations represent like elements throughout, and wherein.

BEST MODE FOR CARRYING OUT THE INVENTION

The present invention provides an arrangement in a public telephone network offering intelligent services for queuing all calls to a subscriber at a destination number during peak calling times and initiating call-backs based on the order that the calls were originally received by the public telephone network. The present invention takes advantage of the call processing functions of an intelligent network, also referred to as an advanced intelligent network (AIN), to provide a flexible queuing arrangement without the necessity of additional equipment at the subscriber premises. A brief description will be provided of the AIN implementing the queuing functions of the present invention, followed by a description of the queuing operations and call-back functions as implemented in the disclosed AIN.

Figure 1:
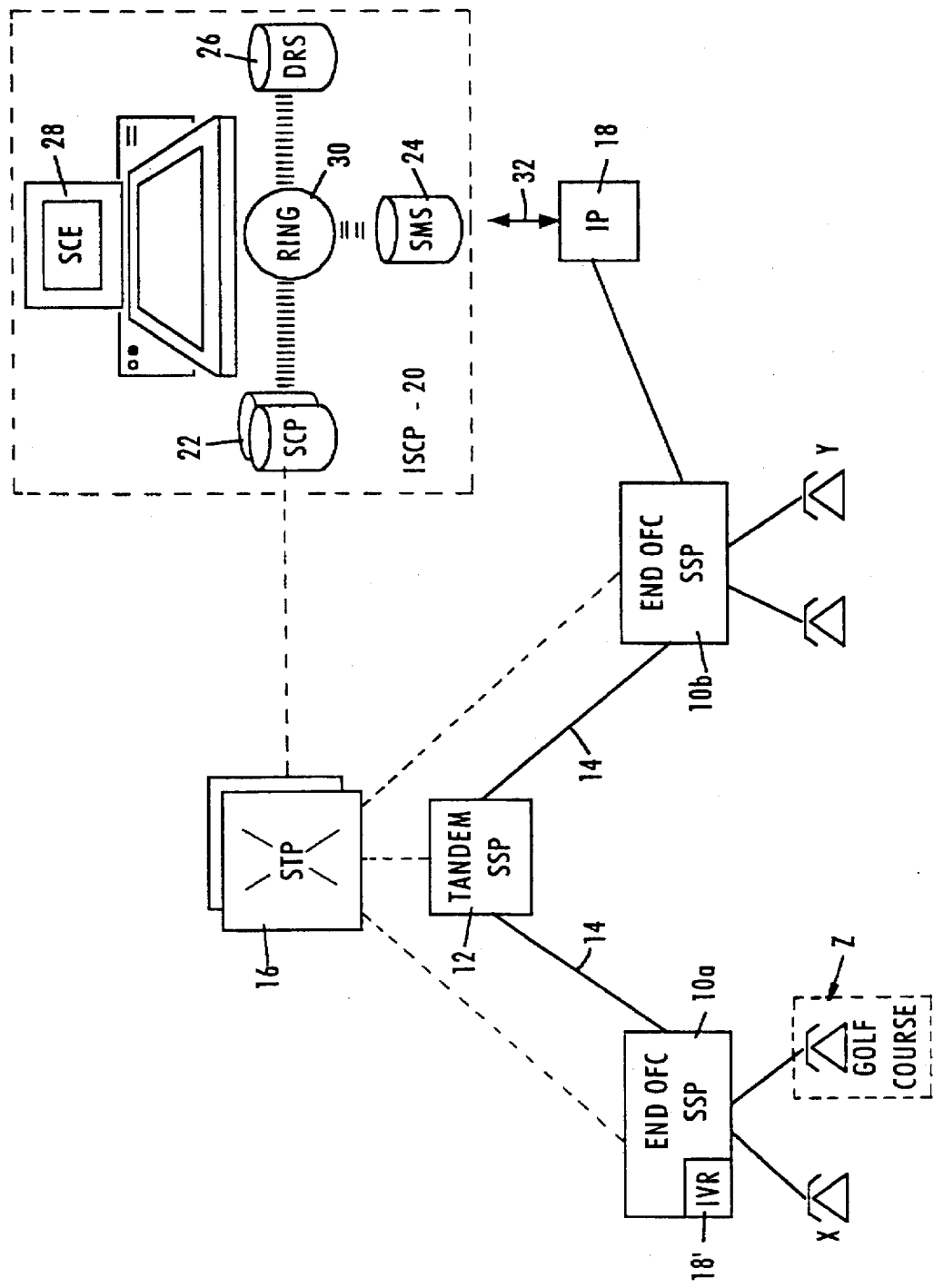
FIG. 1 is a block diagram illustrating an advanced intelligent network using the queuing arrangement according to a preferred embodiment of the present invention.

FIG. 1 provides a simplified block diagram of a public telephone type communications network having program-controlled nodes to provide advanced service capabilities. The network shown in FIG. 1 resembles the type shown in U.S. Pat. No. 5,247,571 to Kay et al., the disclosure of which is incorporated in its entirety by reference, and is thus also referred to as an Advanced Intelligent Network (AIN), wherein the program-controlled nodes are also referred to as "AIN nodes" or "AIN elements". The telephone network of FIG. 1 includes a switched traffic network and a common channel signaling network used to carry control signaling and the like between nodes of the switched traffic network.

The network of FIG. 1 includes a number of end office switching systems 10, also referred to as service switching points (SSPs) for reasons discussed later. The end office switching systems 10a and 10b provide connections to and from local communication lines coupled to end users equipment.

The end offices 10 are typically arranged into a local exchange carrier network typically including one or more tandem switching offices 12 providing trunk connections between end offices. As such, the local exchange carrier network comprises a series of switching offices 10 interconnected by voice grade trunks 14. As known in the art, one or more trunks will typically connect one or more switching offices to at least one switch in other carrier networks (not shown).

Each switching office 10 has at least minimal SS7 signaling capability, which is conventionally referred to as a signaling point (SP) in reference to the SS7 network. In the local exchange network, at least one of the switching offices 10, and preferably all, are programmed to recognize identified events or points in call (PICs). In response to a PIC, the switching office 10 triggers a Transaction Capabilities Applications Protocol (TCAP) query message through the signaling network to an Integrated Service Control Point (ISCP) 20 for instructions relating to AIN type services. Switching offices having the full PIC recognition and signaling capabilities are referred to as service switching points (SSPs).

The ISCP 20 offers AIN routing control functionalities to customers of the local exchange carrier. For example, the ISCP includes an SCP database 22 containing customer profile records (CPRs) for controlling call processing in response to respective triggers. The ISCP 20 may also access a separate database, for example, to supplement its routing tables for certain services. In the preferred system, a second function of the ISCP is to serve as a mediation point. Specifically, the ISCP 20 mediates queries and responses between the local exchange carrier network components and databases operated by other carriers.

The ISCP 20 is an integrated system, and includes a Service Management System (SMS) 24, a Data and Reporting System (DRS) 26 and the actual database referred to as a Service Control Point (SCP) 22. The ISCP also typically includes a terminal subsystem referred to as a Service Creation Environment or SCE 28 for programming the database in the SCP for the services subscribed to by each individual business customer. The components of the ISCP are connected by an internal, high-speed data network, such as a token ring network 30.

The switches 10 typically comprise programmable digital switches with common channel interoffice signaling (CCIS) communications capabilities. One example of such a switch is a 5ESS type switch manufactured by AT&T, although other vendors, such as Northern Telecom and Seimens, manufacture comparable digital switches which could serve as the SSPs and SPs. The SSP type implementation of such switches differs from the SP type implementation of such switches in that the SSP switch includes additional software to recognize the full set of AIN triggers and launch appropriate queries.

Within the local exchange network, the CCIS network includes one or more Signaling Transfer Points (STPs) 16 and data links shown as dotted lines between the STP 16 and the switching offices 10. Typically, STPs 16 are implemented as matching or mated pairs, to provide a high level of redundancy. A data link also connects each of the STPs of pair 16 to the ISCP 20. One or more data links also connect the STPs 16 in the local exchange carrier network to mated pairs of STPs in networks of a second carrier (not shown).

The local exchange carrier network may also include one or more intelligent peripherals (IPs) 18. The IP 18 provides enhanced announcement and digit collection capabilities and/or speech recognition. The IP 18 connects to the switch 10 of the local exchange carrier network via an appropriate line circuit. The IP 18 communicates with the ISCP 20 through a data communication network 32 separate from the telephone company switching offices and associated interoffice signaling network. The data communication network 32 is preferably a packet switched network that serves as a signaling network enabling communications between AIN elements including the IP and the ISCP. The network 32 transports messages using a standardized transport protocol, such as TCP/IP, and may be implemented using X.25, frame relay, SMDS, or ATM technologies.

Commonly assigned copending application Ser. No. 08/248,980, filed May 24, 1994, entitled "Advanced Intelligent Network with Intelligent Peripherals Interfaced to the Integrated Services Control Point" (attorney docket no. 680-076) provides a detailed disclosure of an AIN type network, including the structure of an SSP switch, the structure of an ISCP and the structure of an IP, and the disclosure of that application is incorporated herein in its entirety by reference.

The end office switching system 10 normally responds to a service request on a local communication line connected thereto, for example an off-hook from station X followed by dialed digit information, to selectively connect the requesting line to another selected local communication line, for example to the line to station Z. The connection can be made locally through only the connected end office switching system 10a but typically will go through a number of switching systems.

In the normal call processing, the central office switching system 10 responds to an off-hook and receives dialed digits from the calling station. The central office switching system analyzes the received digits to determine if the call is local or not. If the called station is local and the call can be completed through the one central office (intraoffice call), e.g., from calling station X to called station Z via the central office 10a, the central office switching system connects the calling station to the called station. If, however, the called station is not local, e.g., from calling station Y to called station Z, the call must be completed through one or more distant central offices (interoffice call), and further processing is necessary. If at this point the call were connected serially through the trunks and appropriate central offices between the caller and the called party using in-band signalling, the trunks would be engaged before a determination is made that the called line is available or busy. Particularly if the called line is busy, this would unnecessarily tie up limited voice trunk circuit capacity. The CCIS system through the STP's was developed to alleviate this problem.

In the CCIS type call processing method, the originating end office switching system suspends the call and sends a message through the CCIS network to the end office switching system serving the destination telephone line. The terminating end office determines whether or not the called station is busy. If the called station is busy, the terminating end office so informs the originating end office via CCIS message, and the originating end office provides a busy signal to the calling station. If the called station is not busy, the terminating end office so informs the originating end office. The originating office provides ringback to the caller, and the terminating office applies ringing current to the line to the called party. When the telephone station connected to the called line goes off-hook, the terminating switching office informs the originating switching office, and the two offices establish a telephone connection via the trunks and end offices (and/or tandem offices) of the network between the calling and called stations.

For an AIN type service, such as call redirection based on data stored in the ISCP 20, the end offices and/or tandems are SSP capable and detect one of a number of call processing events, each identified as a 'point in call' (PIC), to trigger AIN type processing. Specifically, in response to such a PIC, a switching system such as switch 10 suspends call processing, compiles a call data message, also referred to as a TCAP query message, and forwards that message via common channel interoffice signalling (CCIS) links and one or more STPs 16 to an ISCP 20. If needed, the ISCP 20 can instruct the particular switching office to obtain and forward additional information. Once sufficient information has reached the ISCP 20, the ISCP 20 accesses its stored data tables and or data in external databases to translate the received data into a call control message and returns the call control message to the switching office via the STP 16 and the appropriate CCIS links. The switching office 10 uses the call control message to complete the particular call through the public switched network in the manner specified by the subscriber's data file in the ISCP 20.

In a mediated call processing operation, a switch such as SSP switch 10 reaches a point in call (PIC) in processing a particular call which triggers AIN type processing. A variety of triggers are known including the full range of AIN triggers, such as off-hook, off-hook delay, private dialing plan, virtual numbers (e.g. 500, 800, 900), terminating attempt, etc. In response to the PIC trigger, the switch 10 launches a TCAP query through the STP 16 to the ISCP 20. The ISCP 20 accesses the relevant call processing record (CPR) for the subscriber.

The SCP 22 will contain a call processing record (CPR) for providing the subscriber a customized service on the particular type of call. The subscriber has previously communicated how certain calls should be processed, and the network's personnel will have established the appropriate CPR in the SCP 22.

The SCP 22 accesses the CPR to determine how to process the particular call and returns an appropriate instruction, in a TCAP response message, to the ISCP 20. The ISCP 20 in turn performs a mediation function. The ISCP 20 formulates an appropriate TCAP response message, and transmits that message through SS7 links and one or more STPs 16 to the switch 10 and the switch processes the call accordingly.

Figure 2:
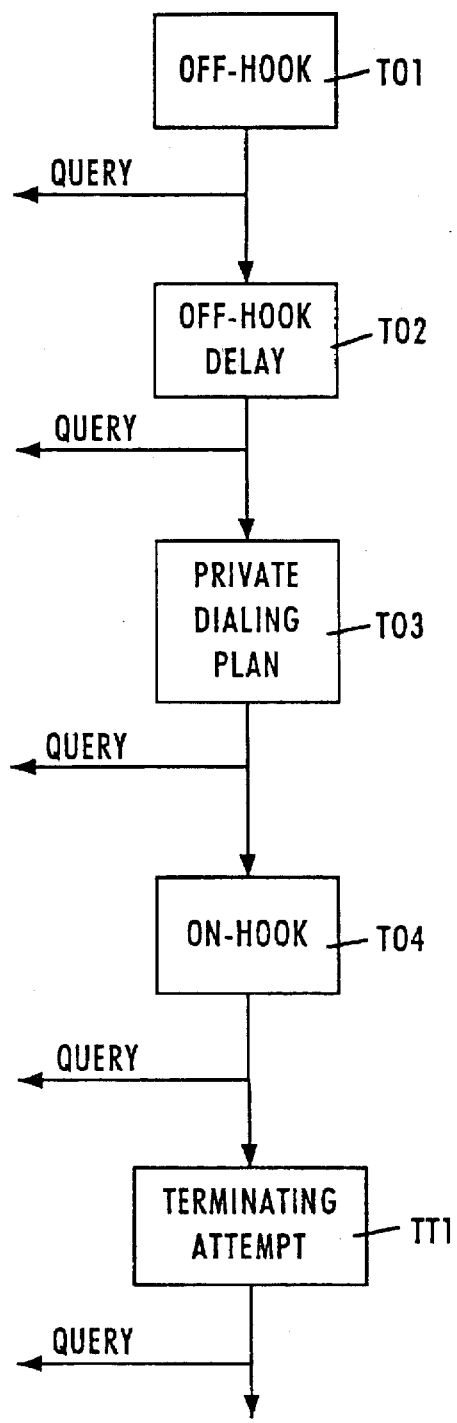
FIG. 2 is a diagram illustrating triggers that may be set in one of the service switching points of FIG. 1.

To further understand the access to trigger functionality, it will be helpful first to consider the relationship between various trigger events. FIG. 2 provides a logical illustration of the relationship between a number of different triggers that may be encountered on any given call. A number of triggers may be set in an originating office, such as an off-hook trigger TO1, an off-hook delay trigger TO2, an individualized dialing plan trigger TO3, and an on-hook or disconnect trigger TO4. Such triggers are set by defining a point in call (PIC) in the subscriber profile for the calling party's line in the switching office serving that line. An off-hook PIC triggers a query immediately whenever a user takes a station off-hook. An off-hook delay PIC triggers a query whenever a station goes off-hook, however, the switch launches the query after collecting dialed digits. An individualized dialing plan PIC triggers a query if a user dials a predetermined or 'plan' number. An on-hook, or disconnect, PIC is the converse of the off-hook PIC, and triggers a query whenever the station goes on-hook.

As shown by FIG. 2, the triggers have a logical hierarchical relationship. If an off-hook trigger or an off-hook delay trigger is set against a particular line, then the switch launches the query every time that a station on that line goes off-hook. The response to that query controls subsequent processing of the call. By contrast, an individualized dialing plan trigger controls call processing only if the caller dials a particular number, assuming that there was no off-hook trigger already set.

Other triggers are set in the terminating office, such as the terminating attempt trigger TT1. Such triggers are set by defining a point in call (PIC) in the subscriber profile for the called party in the serving switching office, as identified by that party's telephone number. An outgoing call may produce a trigger in the originating switching office which results in some AIN processing based on the caller's customized service. When the call reaches the terminating office, the call may trigger some processing based on the called party's customized service.

The types of AIN triggers discussed above are exemplary only. A variety of additional triggers are known. Examples of known AIN triggers include: off-hook immediate, off-hook delay, trunk seizure, primary rate interface, individualized dialing plan, office dialing plan, transit network selection, originating line information, directory number, automatic route selection, automatic alternate routing, basic rate interface feature button, terminating attempt, disconnect, and virtual numbers.

All such triggers cause a program controlled switch to initiate a query to a remote database, in an ISCP, SCP or the like. The database responds with information for controlling further processing of the call by the switch and/or other network elements (e.g. IPs).

According to the present invention, such triggers are used to enable the ISCP to mediate a plurality of calls to a subscriber station by providing a queuing service that records the order of incoming calls in a queue list and performs a call-back from the queue list when the subscriber station is no longer busy. The present invention maintains a call processing record for the subscriber of the queuing service. The call processing record includes a subscriber profile identifying the operational parameters of the queuing service, including start time and stop time. At the start of the queuing interval, the ISCP outputs a message to the end office switch 10a serving a subscriber Z to the service. Upon receiving the message from the ISCP, the end office switch 10a updates its switch translation tables to set a termination attempt trigger and a disconnect (on-hook) trigger on the local communication line serving the subscriber Z.

The termination attempt trigger causes the end office 10a to send a TCAP query message when an incoming call to the subscriber station Z is attempted, enabling the ISCP to mediate the incoming call. Similarly, the disconnect trigger causes the end office 10a to send a TCAP query message when the subscriber Z disconnects with an existing call, enabling the ISCP to select the next call from the queue. Thus, the ISCP mediates the queuing arrangement for the subscriber Z, without the necessity for expensive customer premises equipment.

Consider now one example of use of the queuing functionality of the present invention to queuing and call-back services for one subscriber Z in FIG. 1, also referred to herein as the destination station. Assume now that the subscriber has opted to set up a queuing service during a time period between times $t_1$ and $t_2$ in anticipation of a large number of incoming calls from prospective customers. For example, the subscriber is a pro shop of a golf course that accepts tee time reservations for the upcoming week starting at 8:00 AM every Monday morning. The pro shop estimates that a large number of callers will attempt to call between 8:00 and 11:00 AM in an effort to reserve a tee time, with the heaviest influx of calls between 8:00 and 9:30 A.M. Thus, the pro shop wishes to set up a queuing call-back system whereby callers to the pro shop are identified and queued for automatic callback by rerouting incoming calls to an Interactive Voice Response (IVR) system that queries whether the caller wants to be added to a queue.

The rerouting of the call to the IVR for placement in a queue utilizes a termination attempt trigger set in the profile record of the line for the subscriber. In the example, the subscriber utilizes the station Z, and the switch 10a provides normal service to that line, although outgoing calls can also be blocked (discussed below). The profile record for the line to station Z includes the information needed to establish a PIC for a termination attempt trigger against that line.

Assume a caller at station X dials the telephone number of station Z. The SSP switch 10a detects the termination attempt trigger. In response, the SSP switch 10a formulates a TCAP protocol query message and sends that message through the SS7 network, including one or more STPs 16, to the ISCP 20. In accord with the TCAP protocol, the query includes a variety of information relating to the present call, including called and calling party numbers and other relevant information about the current call, such as the time of the call.

The ISCP utilizes the dialed digits to access an appropriate call processing record. The record may be within its own internal SCP type database, or the ISCP may access a record in a separate database. The record indicates different procedures to be used at different times, for example different priority bypass levels set within the queue interval. If the call occurs between times $t_1$ and $t_2$, the ISCP transmits a TCAP response message through SS7 data links and one or more STPs to the SSP to route the call to an IVR platform, resident in either the SSP serving the subscriber as IVR platform 18' in FIG. 1, another SSP or an auxiliary platform such as the IP. For purposes of further discussion, it will be assumed that the SSP routes the call to the IP 18.

The IP 18 processes the call as a call to the particular subscriber's mailbox, e.g. by playing the subscriber's personalized greeting and recording digits input by the caller indicating whether the caller wants to be added to a queue.

At the destination station, the subscriber is having a telephone conversation with an earlier calling party from the queue to set up the desired reservation. After that reservation is completed, the subscriber and caller complete the call by hanging up, which activates a disconnect trigger in the SSP 10a. The trigger causes the SSP to notify the ISCP that the destination station is able to receive the next caller in the queue.

Figure 3:
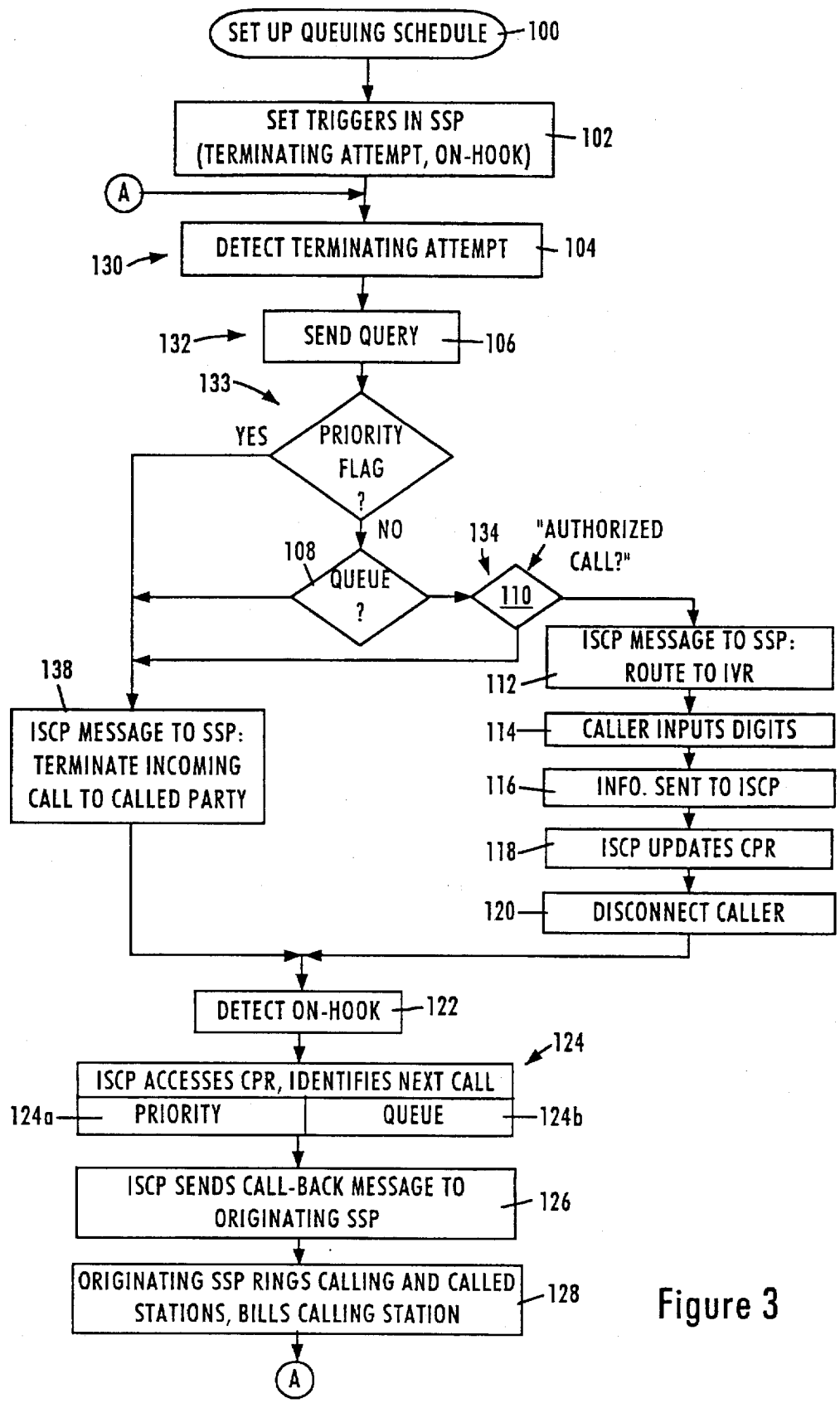
FIG. 3 is a simplified flow diagram of the call processing steps for executing the queuing arrangement of the preferred embodiment of the present invention.
Figure 4:
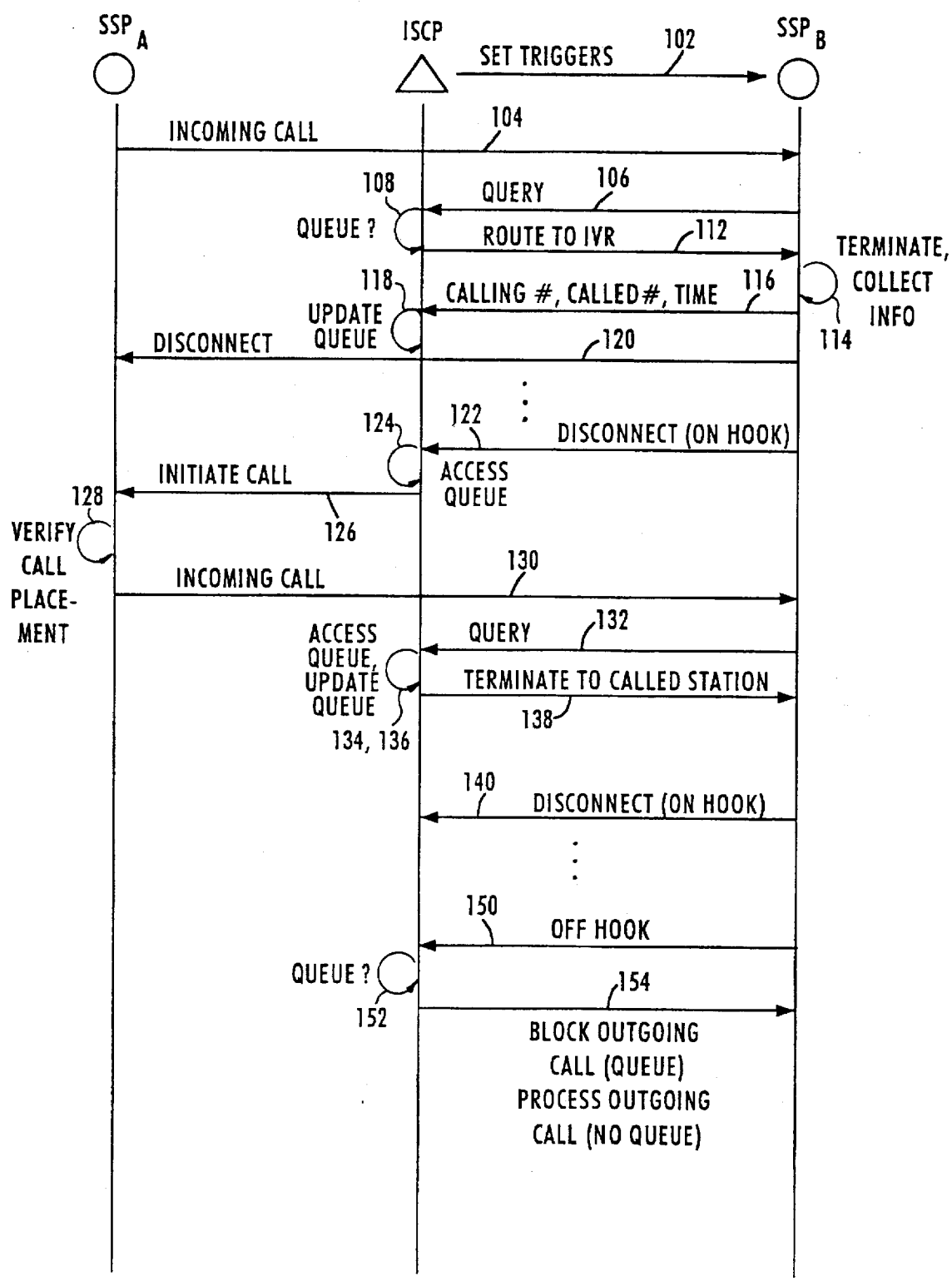
FIG. 4 is a diagram illustrating the call processing messages transmitted between the AIN elements of FIG. 1 during the queuing arrangement of the present invention.

FIG. 3 is a simplified flow diagram of the call processing steps for performing the queuing arrangement of the present invention. In addition, FIG. 4 is a message flow diagram between the SSP 10a, the SSP 10b, and the ISCP and illustrates the various queuing arrangements of the present invention. The first step of the queuing process is to set up a queuing schedule in step 100. As discussed below with respect to FIGS. 5A–5C, the queuing schedule may be set up either by contacting a network service representative upon initiation of the service, or more preferably by performing an interactive voice response session using the intelligent peripheral 18. The queuing schedule established in step 100 is stored as part of the call processing record (CPR) in the SCP database 22 of FIG. 1. The ISCP 20 outputs messages to the corresponding SSP 10a via the CCIS links in response to the information stored in the CPR. Specifically, the CPR includes the subscriber profile identifying the start and stop times of a queuing interval. The ISCP outputs a TCAP message to the SSP 10a at the start time stored in the queuing schedule in the CPR instructing the SSP 10a to set the terminating attempt trigger and the disconnect (on-hook) trigger on the line serving the subscriber Z. Hence, if the queuing schedule indicates a start time for the queuing arrangement at 8:00 a.m. every Monday morning, the ISCP outputs a TCAP message to the end office SSP 10a to set terminating attempt and disconnect triggers on the telephone lines serving the subscriber golf course Z (step 102). Alternatively, the triggers can remain set at all times, and the ISCP will provide different call processing instructions for various calls at different times.

Once the triggers have been set in the SSP 10a, the golf course Z is ready to process incoming calls using the queuing arrangement. In the preferred implementation, the queuing procedure will continue until a message is received from the ISCP 20 to remove the triggers, generated in accordance with the queuing schedule in the subscriber CPR, or due to a subscriber override requesting cancellation of the queuing arrangement. When an incoming call comes into the end office SSP 10a for the subscriber Z in step 104, the end office SSP 10a recognizes the incoming call as a terminating attempt on the telephone line for the subscriber Z, and recognizes the point in call as a terminate attempt trigger set for the line for the subscriber Z. The SSP 10a in response suspends call processing, compiles a call data message, and forwards the message as a TCAP query message to the ISCP 20 via the CCIS links and the SSP 16 (step 106). Upon receiving the TCAP query message, the ISCP 20 in step 107 accesses the customer profile record for the subscriber Z and determines whether there is a priority caller flag set in the subscriber profile (described below). If there is no priority flag, the ISCP in step 108 identifies that a queuing service has been initiated. If there is yet no queue (i.e., the calling party is the first caller), the ISCP sends a message for the SSP 10a to terminate the call to the line serving the subscriber Z. If there is a queue, the ISCP checks in step 110 whether the calling party is the caller at the top of the queue.

If the ISCP 20 determines that the incoming call is not an authorized call (i.e., a caller at the top of the queue), the ISCP sends a message in step 112 requesting the SSP 10a to route the incoming call to an interactive voice response (IVR) unit in order to collect caller information. The IVR application, resident in either the SSP 10a or the IP 18, initiates a session with the calling party that plays an announcement notifying the caller of the queuing arrangement. The announcement also prompts the caller to input certain digits (e.g., *66) to receive a call-back when the caller's turn in the queue comes up. If the caller is a priority caller that uses a password that is recognized by the CPR (see FIG. 6), the caller will enter that password to bypass the queue.

If the caller inputs the digits indicating a desire to be placed in the queue in step 114, the AIN element executing the IVR (either the SSP 10a or the IP 18) collects the information from the caller and sends a message in step 116 to the ISCP 20 to add the calling party to the queue. The message to the ISCP includes the calling party number, the called party number, and the time of the call. The ISCP 20 updates the queue in step 118 by accessing the called party CPR and updating the queue stored in the CPR to include the calling party number based on the identified time of the call. If the calling party is identified in the subscriber profile as a priority caller, a priority flag is set in the subscriber profile to bypass the queue.

Thus, the ISCP updates the CPR of the subscriber station Z to maintain a queue having the calling party numbers arranged on the basis of the time of call. Thus, even though a plurality of callers may be attempting to reach the subscriber station Z at approximately the same time, the ISCP 20 will arrange the queue based upon the actual time of each call as recognized by the CCIS network. As shown in FIG. 1, if the SSP 10a performs the IVR operations, the queue request message is sent via the CCIS links and the STP 16; alternatively, if the IVR functions are performed by the IP 18, the queue message is sent to the ISCP 20 via the data communication network 32.

At the same time that the queue message is sent to the ISCP 20 from the IVR platform, the AIN element performing the IVR operation disconnects the call, and sends a disconnect message to the originating SSP via the CCIS network in step 120.

During the queuing interval stored in the ISCP 20, the subscriber station Z receives telephone calls only from callers that are authorized to be terminated to the subscriber line. Authorized callers are identified as those at the top of the queue, and callers previously identified in the subscriber profile by a predetermined calling number or a password, described in detail below.

An on-hook or disconnect trigger is set in the profile record for the line serving the subscriber station Z. When the subscriber station goes on-hook at the end of a telephone call, the SSP 10a in step 122 sends a TCAP query message to notify the ISCP 20 of the disconnect trigger indicating that the current call is disconnected. The TCAP message typically will include the telephone number of the subscriber station Z. In response to the TCAP message, the ISCP accesses the CPR for the subscriber Z in step 124 to obtain the next caller in the queue based on the stored telephone number. If the priority flag is set in step 124a, the priority caller is identified as the next caller. If there is no priority flag, the next caller in the queue is identified in step 124b as the next caller.

After retrieving the next calling party information from the queue, the ISCP 20 in step 126 sends a TCAP informational message to the SSP serving the next calling party to initiate a call-back operation. For example, assuming that the next calling party in the queue is subscriber Y, the ISCP 20 sends a message to the SSP 10b to initiate a "Repeat Call" feature with respect to the line to subscriber Y. The message also identifies the destination number (e.g., of station Z) for use with the Repeat Call feature. With this feature, the SSP 10b will generate a new call from the line to station Y to the destination Z but will ring station Y only when there is an answer at station Z. As part of the "Repeat Call" process, the SSP 10b initially generates an incoming call message in step 130 and sends that message to the terminating switching office 10a serving the subscriber Z via the SS7 network.

Similar to step 106 above, the terminating switching office 10a detects the terminating attempt trigger on the line serving the subscriber Z and in response suspends the call and generates a TCAP query message to the ISCP 20 including the calling number and the called number in step 132. The ISCP 20 accesses the CPR of the called party Z and determines that the calling party is either a priority caller (step 133) or the first caller in the queue (step 134). In response, the ISCP updates the queue (or clears the priority flag), and sends a TCAP message back to the terminating SSP 10a in step 138 to terminate the incoming call to the line serving the subscriber Z. The terminating end office 10a rings station Z, and that office sends an SS7 message to the originating end office 10b when the called party answers at station Z. At that time, the originating end office 10b rings station Y, and the two offices connect the call through the trunks and tandem office(s). Once the connection is made, the originating end office 10b begins billing the call to the calling party Y.

Thus, the ISCP 20 maintains full control over the incoming calls to the line serving the subscriber Z during the time interval specified in the customer profile record for scheduling the queue. At the time that the queuing arrangement is to be turned off, specified in the CPR, the ISCP 20 outputs a message to the SSP 10a to cancel the triggers to resume normal call processing of the line serving the subscriber Z. In response, the SSP 10a will remove the triggers set on the line serving the subscriber Z, resuming normal call processing operations.

Thus, the present invention enables a subscriber station to use an effective queuing arrangement without the need for purchasing or leasing expensive customer premises equipment, such as computer control processing devices such as PBXs.

In another feature of the present invention, the queuing arrangement of the present invention can prevent outgoing calls while incoming calls are in queue. For example, during busy intervals, a subscriber Z may set up his or her services so that no outgoing calls may be placed in order to process all calls in the queue as quickly as possible. If desired, the system may require a password for outgoing calls, thereby limiting calls to authorized users, such as owners or managers of the commercial business at the subscriber station Z.

An exemplary call flow diagram of this process is shown in FIG. 4. An off-hook trigger is set in the SSP 10a during at least a portion of the queue interval. For example, the off-hook trigger may be set during the entire queue interval, or during a subset of the queue interval. Each time that the station serving the subscriber Z goes off-hook to initiate an outgoing call, the SSP 10a in step 140 sends a TCAP query message notifying the ISCP 20 of the off-hook trigger. The ISCP 20 checks the CPR of the subscriber Z in step 152 to determine if there is a queue. If incoming calls are queued, then the ISCP 20 instructs the SSP 10a in step 154 to route the outgoing call to an announcement, e.g., a busy signal or an announcement that outgoing service is temporarily blocked. If there are no incoming calls in queue, then the ISCP instructs the SSP 10a to process the outgoing call in the normal manner.

Thus, the use of the off-hook trigger minimizes the number of outgoing calls from the subscriber station until the callers in the queue have been serviced. The arrangement arrangement may be modified by substituting the off-hook trigger in step 150 of FIG. 4 with an off-hook delay trigger, whereby the SSP 10a outputs a TCAP query message to the ISCP 20 after collecting dialed digits by the caller at the subscriber station Z. The ISCP 20, responding to the off-hook delay trigger accesses the CPR for the subscriber station Z to determine whether the collected digits in the TCAP query message correspond to the stored password in the subscriber profile allowing outgoing calls during the queue interval. If the collected dialed digits match the password stored in the subscriber profile, the ISCP sends a TCAP message back to the SSP 10a via the CCIS link instructing the end office SSP 10a to play dial tone, collect destination digits and proceed with completion of the outgoing call. Similarly, if the collected dial digits do not match the password stored in the subscriber profile in the CPR, the ISCP 20 outputs a message to the SSP 10a instructing the SSP 10a to route the outgoing call to the announcement that outgoing service is temporarily blocked.

Thus, the use of the off-hook trigger is useful for blocking all outgoing calls while a queue is in place. Alternatively, the off-hook delay trigger is useful for selectively blocking outgoing telephone calls from the subscriber station Z, whereby only authorized callers having an appropriate password may make outgoing telephone calls during peak intervals.

Figure 5A:
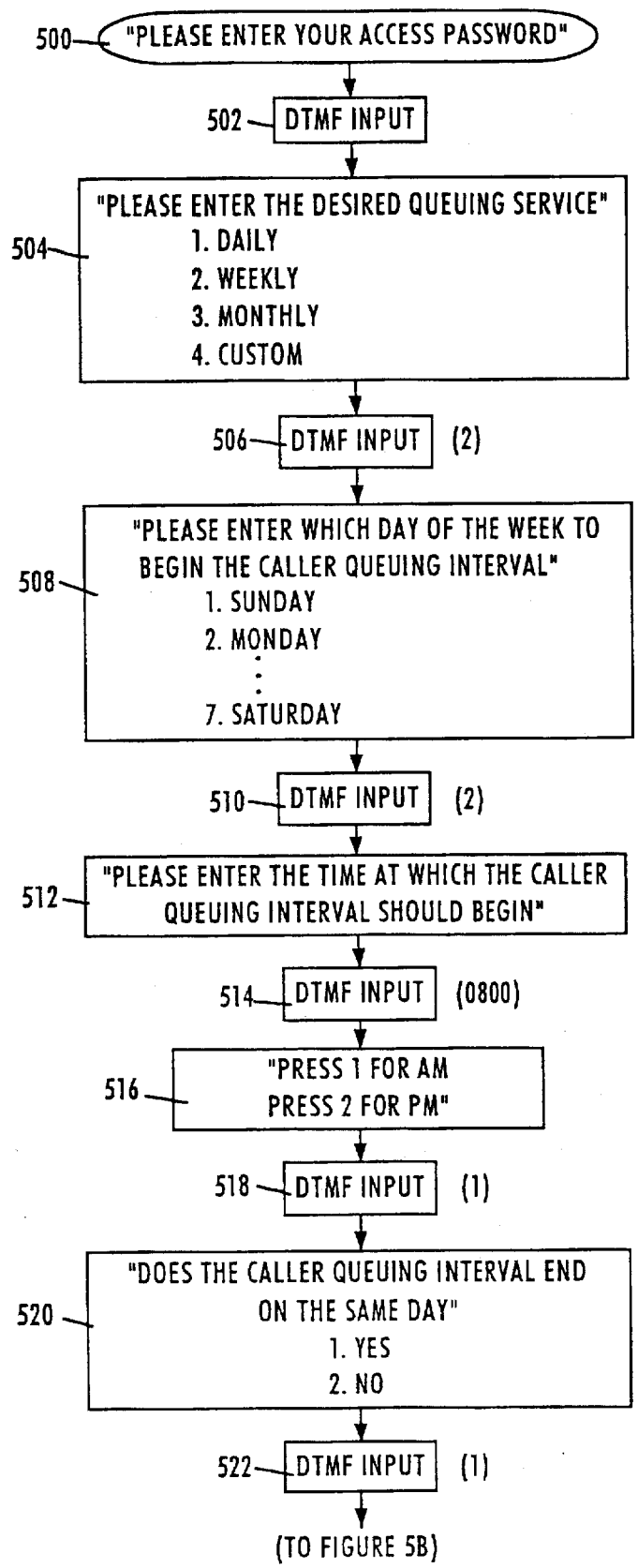
FIGS. 5A, 5B and 5C summarize a procedure for a subscriber of the queuing arrangement to program the ISCP of FIG. 1 using an interactive voice response application.
Figure 5B:
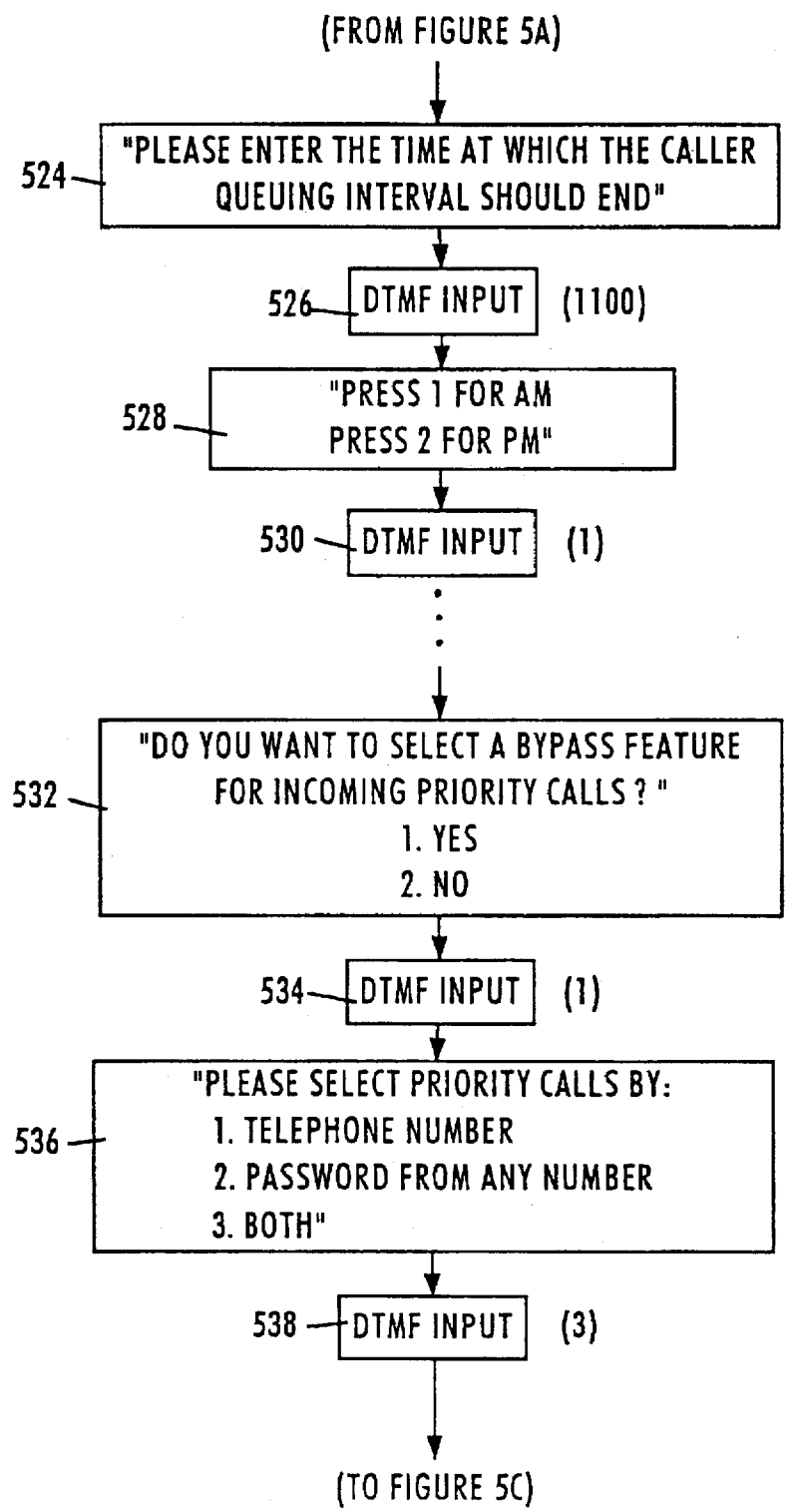
Figure 5C:
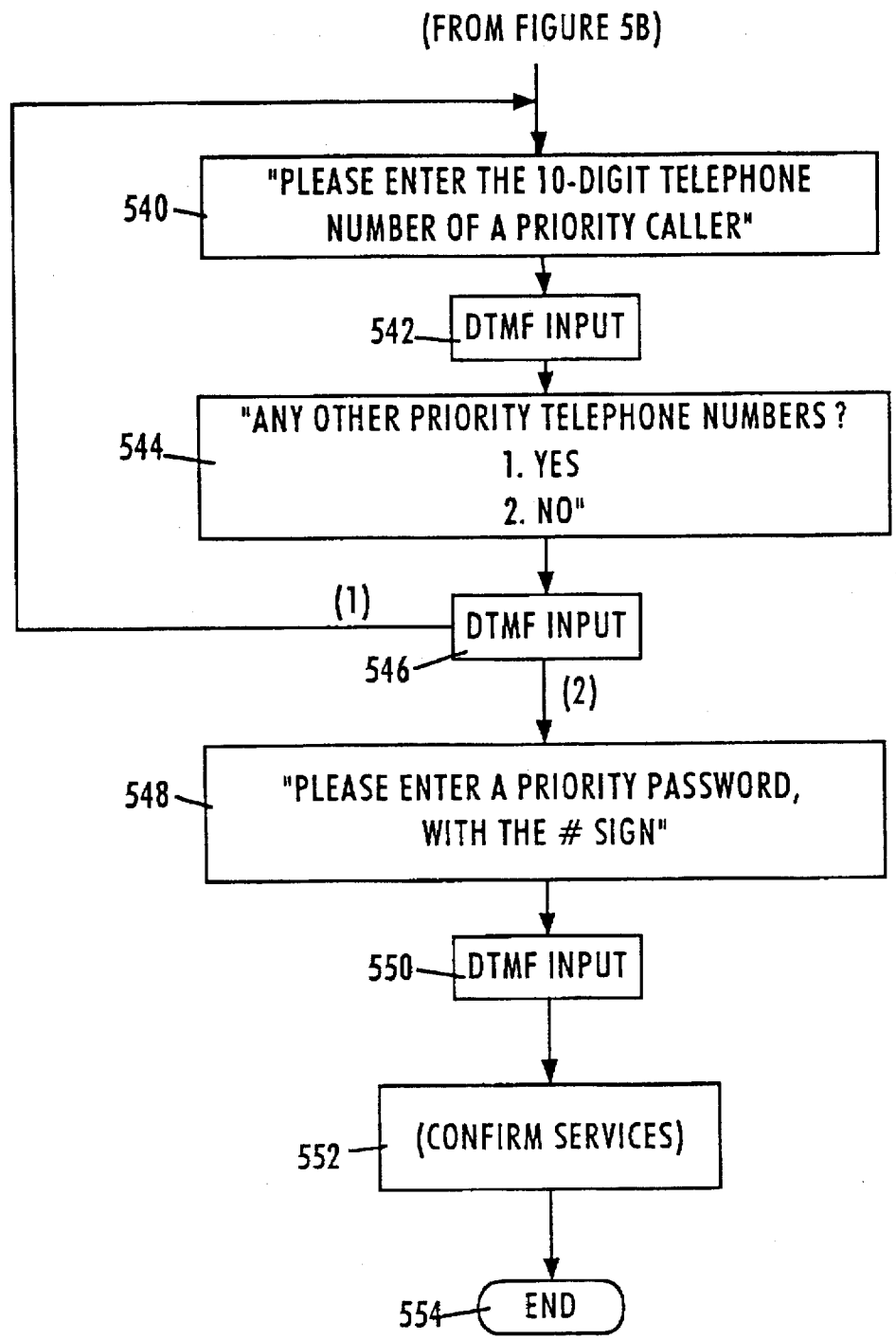

FIGS. 5A–5C summarize an exemplary process flow for establishing the service profile information to be stored in the CPR. Specifically, FIGS. 5A–5C illustrate an interactive process between the subscriber Z and an IVR platform, implemented in an AIN element such as the IP 18, in order to supply the service information for the queuing arrangement to the ISCP.

The process begins in FIG. 5A by the subscriber calling a predetermined number to access the service platform. For example, the subscriber may call a predetermined virtual number in order to access the services platform. Upon connecting with the platform, the IVR platform prompts the user in step 500 to enter the appropriate access password. The subscriber dials the password using the DTMF inputs in step 502 in response to the prompt by the IVR platform. After entering the password, the IVR will recognize the user based upon the password, and will provide a main menu in step 504 for the caller queuing service. If necessary, the IVR platform may output queries to the ISCP during the interactive session in order to obtain additional information, for example, to verify the accuracy of the password.

The IVR platform will prompt the subscriber in step 504 for either a daily, weekly, monthly, or custom queuing service. In response, the user will provide a DTMF input in step 506, for example by pressing the "2" key to select a weekly queuing service. In response to the selection, the IVR platform in step 508 prompts the user for which day of the week to begin the caller queuing interval. After the user inputs the day to begin the caller queuing interval in step 510 (for example, "2" for Monday), the IVR platform in step 512 prompts the user to enter the time at which the caller queuing interval should begin. The user will then input the time to begin the queuing interval on the specified day in step 514, for example by pressing the sequence "0800" to specify 8:00 in step 514. The IVR platform will then prompt the user to specify whether the time is a.m. or p.m. in step 516, to which the user will specify the time in step 518. Alternatively, steps 512 and 516 can be combined by using 24-hour time designations.

After the user has specified the start time of the queue interval, the IVR platform prompts the user in step 520 to specify the end of the queuing interval by first inquiring whether the queuing interval begins and ends on the same day. If the user responds in step 522 by inputting a "1" indicating that the queuing interval begins and ends on the same day, the IVR platform prompts the user in step 524 to enter the time at which the queuing interval should end (see FIG. 5B). In response, the user inputs the end time for the queuing interval in step 526, and after prompting by the IVR platform in step 528, inputs whether the time is a.m. or p.m. in step 530.

After the user has input the beginning and end times of the queuing interval, the IVR platform will typically review the user selections and request confirmation of the user selection (not shown).

During the interactive session, the subscriber may also specify whether there exist any priority callers that are able to bypass the queuing arrangement. As shown in FIG. 5B, the IVR platform prompts the user during the interactive session whether a bypass feature for incoming priority calls is desired (step 532). If the user responds in step 534 by inputting a "1" for selecting a bypass feature for priority calls, the IVR platform prompts the user in step 536 to select an incoming priority call either by the caller's telephone number, an input password which may be used from any calling station, or both.

Assuming the user in step 538 inputs the DTMF digit "3", whereby priority callers may be identified either by their telephone number or by a password, the IVR platform in step 540, shown in FIG. 5C, first prompts the user to input the ten digit telephone number of a priority caller in step 540. After the user in step 542 inputs the ten digit telephone number using the DTMF input, the IVR platform in step 544 prompts the user whether there are any other priority telephone numbers in step 544. If the user in step 546 provides a DTMF input indicating additional numbers, the process is returned to step 540 to input additional numbers. Otherwise, the process proceeds to step 548, whereby the IVR platform prompts the user to enter the priority password, beginning with the pound (#) sign. The user in step 550 uses the DTMF keypad to input the priority password to be used by callers in bypassing the queue in order to be recognized as a priority caller in the service profile.

Thus, upon receiving the priority information and verifying the subscriber selections in step 552, the AIN element executing the IVR platform, in this case the IP 18, terminates the call and supplies the information to the ISCP in step 554 for processing the CPR for the subscriber Z.

Figure 6:
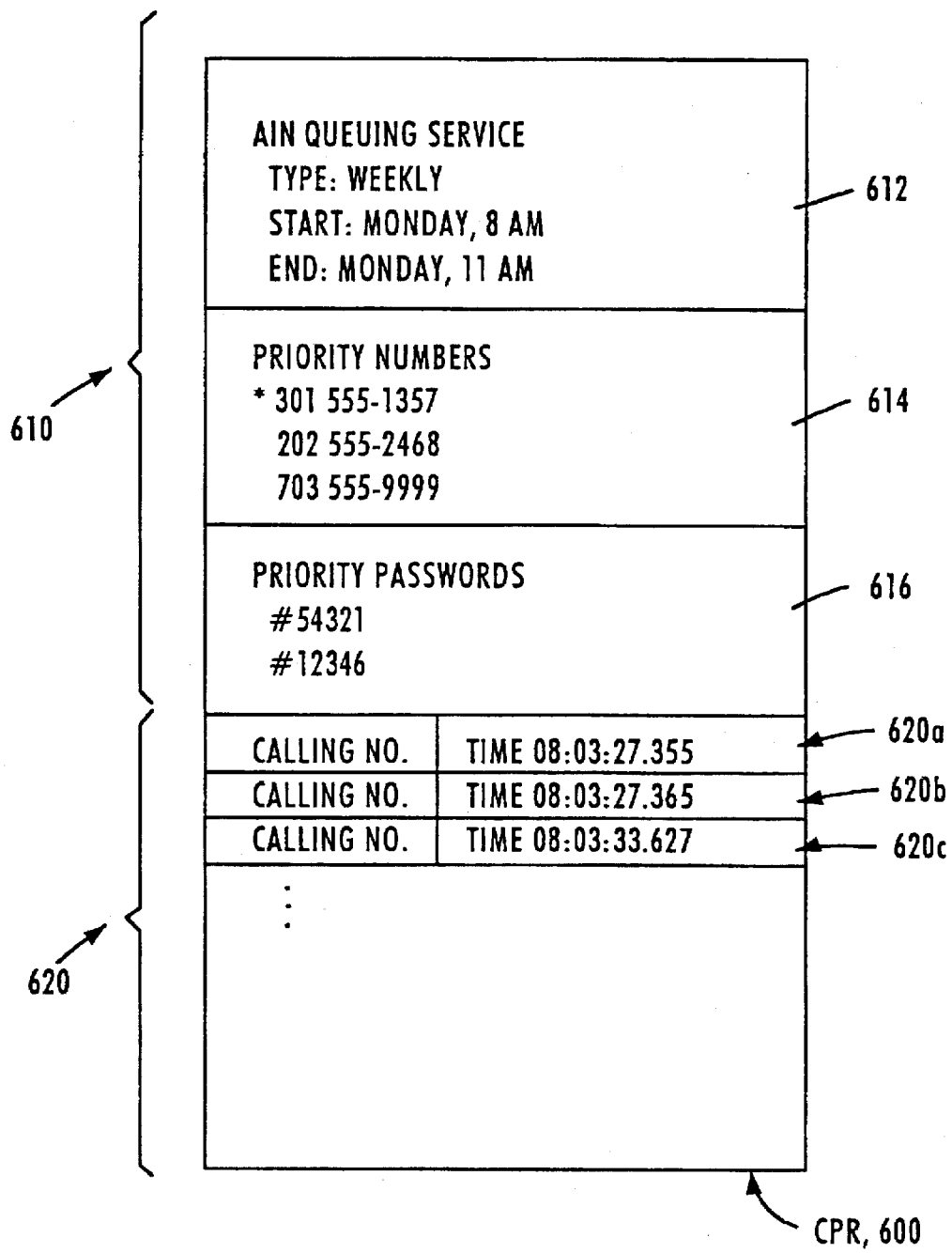
FIG. 6 is an illustration of a Call Processing Record stored in the ISCP of FIG. 1 in accordance with the queuing arrangement of the present invention.

FIG. 6 is an illustration of a call processing record 600, generated after an interactive session with the user as described above with respect to FIGS. 5A–5C. The CPR 600 in FIG. 6 may also be generated by telephone network personnel using the service creation environment 28 at the time the subscriber initially subscribes to the queuing service.

The CPR 600 has a subscriber profile portion 610 and a queue portion 620. The subscriber profile portion 610 includes a service identifier 612 that identifies the type of AIN service being provided, in this case a queuing service. The service identifier 612 illustrated in FIG. 6 specifies that the queuing service is a weekly service that has an interval beginning at Monday, 8:00 a.m., and ending at Monday, 11:00 a.m. The service profile portion 610 also includes a priority caller profile that identifies priority callers that are registered to bypass the queue portion 620. For example, a priority number record stores preselected ten digit telephone numbers of callers that have assigned priorities. As shown in FIG. 6, the first telephone number (301) 555-1357 has a flag (*) that serves as a priority flag for the corresponding number. As shown in FIG. 3, the ISCP will identify in step 124 the priority flag assigned to the priority number (301) 555-1357. As a result, the ISCP will send the priority number to the originating SSP with an instruction to initiate the call. When the ISCP processes the TCAP query message from the SSP serving the subscriber station Z generated in response to the terminating attempt trigger in step 130, the ISCP will identify in step 133 that the priority flag is set. Hence, the ISCP will instruct the SSP to complete the call corresponding to the priority number to the called line, enabling the party calling from the priority number (301) 555-1357 to bypass the queue 620.

Similarly, the subscriber profile 610 includes a password record 616 that identifies priority callers that call from any telephone station. For example, referring to FIG. 3, if a caller in step 114 enters the priority password "#54321" instead of the conventional prompt "*66", the ISCP will update the CPR in step 118 by placing the calling number at the first queue location 620a. Thus, priority callers are able to bypass the remaining queue from any number using the preselected priority password.

According to the present invention, the advanced intelligent network enables queuing of a plurality of callers based on mediated access by the ISCP. As will be appreciated in the art, the ISCP will mediate any conflicts that may arise between multiple calls occurring simultaneously. For example, if a plurality of priority numbers simultaneously request access to a subscriber station, the ISCP will manage the calls so that priority numbers are processed before the callers in the queue. Additionally, the ISCP will mediate multiple triggers from the SSP 10a that may be generated due to different AIN services.

The queuing arrangement of the present invention provides the ability for small businesses and the like to provide advanced call processing functions without the need for expensive customer premises equipment. Moreover, the ability to allow selective access by priority callers ensures that important business functions are not interrupted due to a high volume of incoming telephone calls during the queuing interval.

In addition, it will be appreciated that the queuing arrangement of the present invention may be combined with additional services mediated by the ISCP. For example, the queuing arrangement of the present invention may be combined with a method and apparatus for selectively blocking incoming telephone calls, whereby subscribers that selectively block incoming calls are able to have the denied calls queued for call-back at a later time. Such an arrangement is particularly effective for subscribers that work at home, and do not wish to be disturbed with business calls during evening hours, but who wish to be able to call back business calls after the blocking interval is over. A more detailed description of a method and apparatus for selectively blocking incoming telephone calls is disclosed in commonly-assigned U.S. Pat. No. 5,467,388 to Redd, Jr. et al., the disclosure of which is incorporated in its entirety by reference.

While this invention has been described in connection with what is presently considered to be the preferred embodiment, it is to be understood that the invention is not limited to the disclosed embodiment, but, on the contrary, is intended to cover various modifications and equivalent arrangements included within the spirit and scope of the appended claims.

We claim:

1. A public telephone network for providing a queuing service for a called party without the necessity for computer-based queuing systems at a called party's premises, comprising:

a services control point database storing call processing data for the called party subscribing to the queuing service, said call processing data including a queue list for queued calling stations;

a plurality of interconnected central office switching systems forming connections between a plurality of local communication lines, one of the central office switching systems having a first of said local communication lines connected thereto and serving the called party, the one central office switching system outputting a first query message to the database in response to a service request to provide a communication connection between said first local communication line and an incoming call on a second of said local communication lines, the one central office switching system outputting a second query message to the database in response to a disconnect condition detected on said first local communication line;

a signaling communication system for two-way communications of messages between the central office switching systems and the services control point database;

wherein:
in response to said first query message, said database:
(1) outputs a first database message for said one central office switching system to connect the first and second local communication lines if the queue list is empty, and
(2) stores data identifying the second local communication line in the caller queue list if the queue list is not empty; and in response to said second query message, said database outputs a second database message to initiate a call between the called party and a calling station identified at the top of the queue list.

2. A public telephone network as in claim 1, wherein said database outputs a third database message to said one central office switching system in response to said first query message and if the queue list is not empty, the public telephone network further comprising an intelligent peripheral supplying the identifying data, said one central office switching system connecting said second local communication line to the intelligent peripheral in response to said third database message.

3. A public telephone network as in claim 1, further comprising an intelligent peripheral that supplies call processing data specifying a queuing interval to the database in response to an interaction with the called party on said first communication line.

4. A public telephone network as in claim 1, wherein said call processing data further includes priority caller data identifying priority callers to be connected with the called party before the queued calling stations.

5. A public telephone network as in claim 4, wherein said database, upon receipt of said second query message, outputs said second database message to the central office connected to the second communication line for connection of the incoming call to the called party if the priority caller data stored in said database identifies said incoming call as one of the priority callers.

6. A public telephone network as in claim 1, further comprising an intelligent peripheral supplying call processing data to the database, wherein the supplied call processing data comprises priority password data identifying priority calling stations to be connected with the first local communication line before a calling station identified at the top of the queue list.

7. A public telephone network as in claim 1, wherein said call processing data further includes an outgoing call blocking service, the one central office switching system outputting a third query message in response to an off-hook condition detected on said first local communication line, the database in response to the third query message outputting a blocking message instructing the one central office switching system to prevent outgoing calls on the first local communication line.

8. A public telephone network as in claim 1, further comprising means for supplying information for a queuing interval to said database.

9. A public telephone network as in claim 8, wherein the supplying means comprises an interactive response means for collecting said information from the called party.

10. A public telephone network as in claim 9, wherein said interactive response means comprises an interactive voice response platform resident in one of the central office switching systems, the interactive voice response platform supplying and receiving service information during a call terminated with the called party.

11. A public telephone network as in claim 1, wherein said database outputs an activation message to the one central office switching system to initiate the queuing service for a predetermined queuing interval; and the one central office switching system activates a termination attempt trigger and a disconnect trigger on the first local communication line in response to receipt of said activation message.

12. A public telephone network as in claim 1, wherein said database outputs said first database message for said one central office switching system to connect the first and second local communication lines in response to said first query message and if said second local communication line corresponds to a calling station identified at a top of the queue list.

13. In a public telephone network comprising a services control point database storing call processing data, local communication lines, a plurality of central office switching systems forming connections between the local communication lines, and a signaling communication system interconnecting the central office switching systems and the services control point database, a method of providing a queuing service to a subscriber having a first communication line connected to the public telephone network without the necessity for computer-based queuing systems at the subscriber's premises, the method comprising the steps of:

outputting a first query message from one of said central office switching systems serving the first communication line to the database in response to an incoming call request from a calling station via one of said communication lines;

accessing the call processing data for the first communication line in response to the first query message, the call processing data including a queue portion adapted to identify a plurality of calling stations in a calling queue;

determining a relationship between the calling station and the queue portion and outputting a first response message from the database to the one central office switching system on the basis of the determined relationship;

adding information of the calling station to the queue portion if the calling station is not in the queue;

connecting the calling station and the first communication line within the one central office switching system if the received first response message indicates the calling station is first in the calling queue;

outputting a second query message from the one central office switching system to the database in response to a disconnect detection on the first communication line;

accessing the call processing data for the first communication line in response to the second query message to identify a first of the calling stations in the calling queue; and outputting from the database a second response message to a central office switching system serving the identified first of the calling stations in the calling queue to initiate a call between the identified first of the calling stations in the calling queue and the first communication line in response to the second response message.

14. A method as in claim 13, further comprising the steps of:

outputting a third query message from the one central office switching system in response to an off-hook detection on the first communication line;

accessing the call processing data for the first communication line in response to the third query message to determine an outgoing call status;

blocking an outgoing call by the subscriber at the one central office switching system in response to the determined outgoing call status.

15. A method as in claim 14, further comprising the steps of:

receiving during the blocking step an override password input by the subscriber, said blocking step comprising the step of routing the outgoing call to an interactive voice response (IVR) unit;

outputting from the IVR unit to the database a fourth query message including the received override password;

accessing the call processing data for the first communication line in response to the fourth query message and comparing the received override password with a stored override password in the accessed call processing data; and allowing the first communication line to make an outgoing bypass call if the received override password matches the stored override password.

16. A method as in claim 14, further comprising the steps of:

receiving during the blocking step an access password input by the subscriber, said blocking step comprising the step of routing the outgoing call to an interactive voice response (IVR) unit;

outputting from the IVR unit to the database a fourth query message including the received access password;

accessing the call processing data for the first communication line in response to the fourth query message and comparing the received access password with a stored access password in the accessed call processing data; and outputting a response message to the IVR unit to initiate an interactive session, enabling the subscriber to make changes to the subscriber profile information stored in the call processing data for the first communication line, if the received access password matches the stored access password.

17. A method as in claim 13, wherein the call processing data further includes a priority calling station portion, said determining step including the steps of:

comparing an identity of the calling station with the priority calling station portion, and connecting the calling station with the first communication line if the identity of the calling station is stored in the priority calling station portion.

18. A method as in claim 17, wherein the identity of the calling station is a calling station number.

19. A method as in claim 17, wherein the identity of the calling station is determined by a priority password.

* * * * *